United States Patent
Starr

[11] 3,805,863
[45] Apr. 23, 1974

[54] THREADED PIN-COLLAR SYSTEM WITH RETENTION MEANS

[75] Inventor: Donald G. Starr, San Diego, Calif.

[73] Assignee: Hi-Shear Corporation, Torrance, Calif.

[22] Filed: Jan. 17, 1972

[21] Appl. No.: 218,310

[52] U.S. Cl. ............................................. 151/2 R
[51] Int. Cl. .......................................... F16b 39/22
[58] Field of Search ......... 151/19 R, 69, 70, 2, 2 A; 85/61

[56] References Cited
UNITED STATES PATENTS
873,424   12/1907   Greene ............................ 151/2 A
3,421,562  1/1969   Orloff et al. ..................... 151/2 R

*Primary Examiner*—Edward C. Allen
*Attorney, Agent, or Firm*—Donald D. Mon

[57] ABSTRACT

A pin-collar system having means for retaining a threaded collar to the threaded pin. The pin fits in an aperture in a workpiece so that its thread and a peripheral groove stand outside the workpiece. A deflector plate is placed over the pin with one of its faces bearing against the workpiece. The other of its faces has an inwardly tapering deflector surface to deflect a lock section on the collar into the groove. The collar has an internal thread which is engaged to the thread on the pin, the inward deflection of the lock section occurring as the collar is tightened down onto the pin. According to a preferred feature of the invention, torque-tool engaging means is provided on a drive section which is attached to the remainder of the collar by a shear section which has the least resistance to torque from end to end of the collar so that the driving forces shear it off when a predetermined torque is exerted on it.

1 Claim, 6 Drawing Figures

PATENTED APR 23 1974    3,805,863
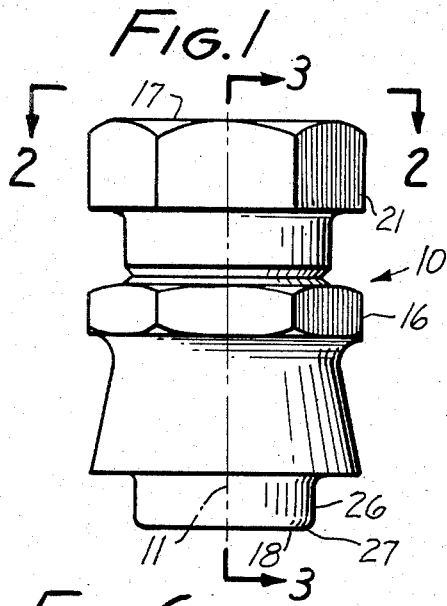
FIG.1
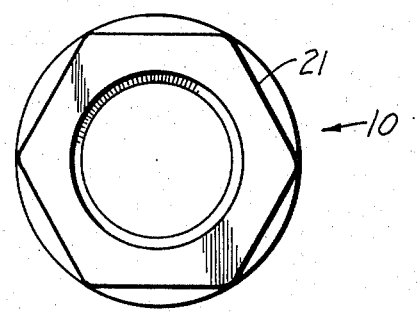
FIG.2
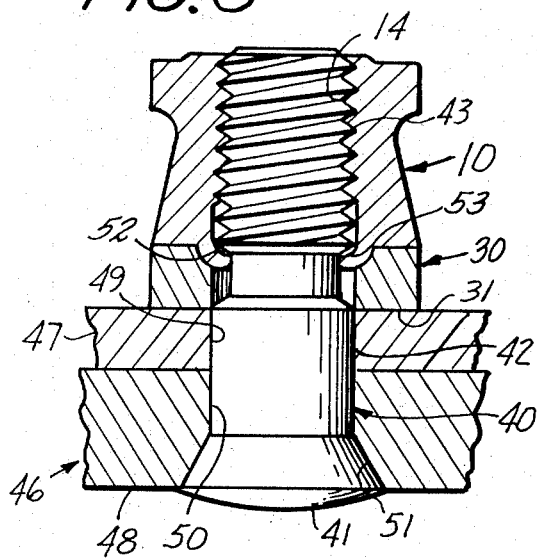
FIG.6
FIG.3
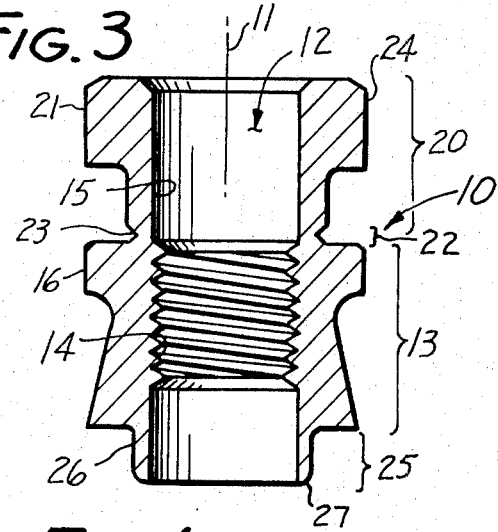
FIG.4
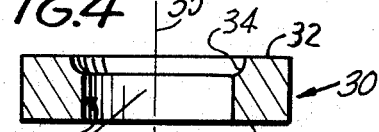
FIG.5
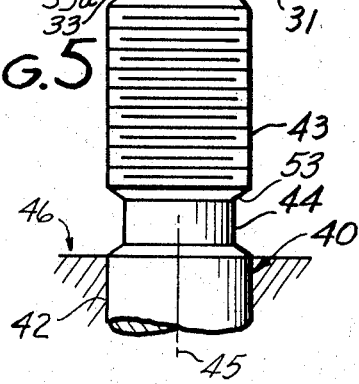

THREADED PIN-COLLAR SYSTEM WITH RETENTION MEANS

This invention relates to a threaded pin-collar system which is provided with means for resisting unthreading of the pin from the collar once the collar has been set to a predetermined torque.

There are many installations of threaded fasteners such as that of an externally threaded pin and an internally threaded collar where thread lock means is provided to resist the shaking off of the collar from the pin. Such systems are in widespread usage, but still, in critical areas such as jet engine intake installation and the like, there remains an unfulfilled need for a retention means which will give a positive mechanical assurance that even if the collar becomes loosened it will not fall free. Such an arrangement would prevent loose parts from being drawn in to jet engines with disastrous effect.

It is an object of this invention to provide a pin-collar system which can readily be set to a predetermined torque and which in the process of being set to that torque forms from the material of the collar a positive mechanical stop to resist the unthreading of the collar from the pin.

The invention is accomplished with the combination of a threaded collar and a pin, which pin has an axially extending shank, a thread on the shank and a peripheral groove adjacent to the thread. The thread and the groove project beyond a workpiece in which the shank fits. A deflector plate has an aperture passing through it, and is fitted over the projecting portion of the pin with one of the faces of the deflector plate bearing against the workpiece. A deflector surface extends from the other of the faces of the deflector plate into the aperture and comprises a surface of revolution around the axis of the aperture. The generator line of the surface of this revolution extends toward the axis and as it extends away from the second face. The collar has an internal threaded passage beyond which there extends a tubular deformable lock section which, when the collar is turned onto the pin makes contact with the deflector surface so as to be deflected inwardly into the groove as the collar is tightened down, thereby to form a lip which makes a positive fully peripheral lock to resist the removal of the collar from the pin. The deflector plate is separate from the pin and the collar. When the fastener is set, it is unattached to either of them.

The invention will be fully understood from the following detailed description and the accompanying drawings in which:

FIG. 1 is a side elevation of the presently preferred embodiment of one portion of the invention;

FIG. 2 is a top view taken at line 2—2 of FIG. 1;

FIG. 3 is an axial cross-section taken at line 3—3 of FIG. 1;

FIG. 4 is an axial cross-section of another portion of the invention;

FIG. 5 is a side elevation, partly in cut-away cross-section, of still another portion of the invention; and FIG. 6 is a view, principally in axial cut-away cross-section, showing the system of the invention installed in a workpiece.

In FIG. 1 there is shown a collar 10 which has a central axis 11 and a central axial passage 12. The collar includes a body section 13 with an internal thread 14 on the internal peripheral wall 15 of the passage. Thread 14 is confined to the body section, and preferably extends along only part of its axial length. Externally, the body may optionally be provided with a set of torque-tool engaging surfaces 16. A suitable set may be a hexagonal array. The collar has a first and second end 17, 18.

A drive section 20 is formed integrally with the collar adjacent to its first end 17. The passage is smoothly bored in the drive section and bears on its outer surface a set of torque-tool engaging surfaces 21 for driving the collar. A suitable set may be a hexagonal array.

A shear section 22 is formed by an external groove 23. The shear section has the least resistance between the ends of the fastener to torsional shear. The drive section is attached to the body section by the shear section.

A lock section 25 is formed at the second end 18 of the collar. It comprises a tubular deformable member 26 with a chamfer 27 at its free end. The passage 12 is smooth-walled in this section, as well as in a counter-bored portion of the passage inside the body section adjacent to the thread. The lock section is annular in a cross-section taken normal to the central axis. Its wall thickness is smaller than that of the threaded portion of the collar.

A deflector plate 30 is formed as an annular disc and is best shown in FIG. 4. It has a first and a second face 31, 32 respectively. An aperture 33 passes from face to face of the deflector plate. The aperture is defined by smooth wall 33a. By "smooth" is meant a wall which is not adapted to be attached to anything, for example, an unthreaded wall. Accordingly, this lock section will remain separate from and unattached to either the collar or the pin as a consequence of the smoothness of the wall. The dimensions of the lock section are such that, until it is compressed between the collar and the workpiece, it is free to turn relative to the pin and the collar. A deflector surface 34 is a surface of revolution around central axis 35 of the deflector plate (which is also the central axis of the collar and of the pin when the fastener is assembled). Its generator line, which is the line shown in cross-section, is rotated around the central axis to form the surface. The generator line extends laterally inward as it extends away from the second face.

In FIGS. 5 and 6 there is shown a pin 40 which includes a head 41 and a shank 42. The shank carries a peripheral thread 43 adjacent to which there is a peripheral groove 44, the groove having a substantial axial length along the central axis 45 of the pin. A continuous fully peripheral shoulder 53 in the form of a surface of revolution generated centrally around the central axis 45 bounds the edge of the groove which is uppermost in FIG. 5.

It is the purpose of the pin-collar system to cooperate with a workpiece, and the shank will in one way or another be engaged to the workpiece. Probably the most common form of association will be that which is shown in FIG. 6, wherein a workpiece 46 comprises a pair of plates 47, 48 or other types of member with aligned holes 49, 50 therethrough. The head of the pin fits in a counter-sink 51 in plate 48, and the thread of the pin and at least part of the groove project beyond the workpiece.

When a torque limitation is not to be inherently exerted by the collar itself, then the drive section may be eliminated and the torque-tool engaging surfaces 16 may be used to tighten down the collar. Alternatively when the drive section is to be utilized for inherent torque limitation then the engaging surfaces 16 can optionally be provided for usage after the driving section has been torqued off, the engaging surfaces 21 being used to set the fasteners.

To utilize this system and make a joint according to the invention, the pin is fitted into the respective hole or holes in the workpiece as shown in FIG. 5. Then the deflector plate is placed over the free end of the pin and the collar is threaded onto the threads. It is tightened down, and as it moves along the axis, the free end of the lock section makes contact with the deflector surface and the deflector surface turns it inwardly as a continuous lip 52 (FIG. 6) which overhangs a continuous non-threaded edge 53 of the groove. FIG. 6 shows the preferred situation where the lip and the edge make direct engagement when the drive section has just sheared off. Ordinarily, however, there will be tolerances and grip ranges so that the axial length of the groove will be made such that the lip can be turned in at substantially any axial location along the groove. This will of course permit a certain amount of unthreading of the collar from the pin, but it will not permit it to fall free unless and until the removing forces are sufficient to overcome the holding ability of the lip by straightening it out. Such forces are unlikely to be exerted by mere vibration. Both the installation and the forced removal of the collar require permanent physical displacement of material in order to be accomplished. Accordingly, this device upon its own installation becomes self-retaining. In summary, it will be noted that the deflector plate does not form part of the retention means of this fastener system. It is provided only for the purpose of deforming the lock section so as to form a lip in the groove. It remains unattached to either the collar or to the pin and remains in place only because it is compressed between the collar and the workpiece. Apart from the restraint imposed when it is compressed between the collar and the workpiece, it is free to rotate relative to the pin and to the collar.

The dimensions of the lock section are so selected relative to the strength of material that the deflection of the lock section will have been completed by the time the maximum torque, as determined by the shear section, has been exerted, in order that the installation will be complete at the time the proper torque is exerted.

The pin, collar, and deflector plate may be made of any suitable material, preferably metallic. Aluminum, steel and titanium alloys are examples of satisfactory materials.

The term "pin and collar" is intended to include the term "nut and bolt." In the field of threaded fasteners wherein close control over torque is inherently maintained, such as by providing the collar with a section that shears at a predetermined torque, the terms "pin" and "collar" are frequently used to distinguish them from common bolts and nuts which do not have such features. The locking feature of the fastener according to this invention is admirably suited to usage in inherently torque-limited systems, because its locking element can be made of the same material as that of the torque-sensitive material, and their relative strengths can readily be selected and manufactured. For that reason, the more sophisticated terminology has been used in order to identify the best use of this feature.

However, this feature is also applicable to common bolt and nut systems wherein control of torque may not be important, or wherein the means for torque control is not inherent in the system itself, but instead is external, such as by the use of a torque wrench. The terminology "pin" and "collar" is, therefore, not intended as a limitation on the generality of the invention, and is not intended to limit the same to systems wherein the torque is inherently limited, such as by a shear section.

This invention is not to be limited by the embodiments shown in the drawings and described in the description, which are given by way of example and not of limitation, but only in accordance with the scope of the appended claims.

I claim:

1. In combination: a metal pin having a central axis, an axially-extending shank, a thread, a fully peripheral groove adjacent to said thread, and a fully peripheral shoulder in the form of a surface of revolution generated centrally around the central axis adjacent to the thread and bounding one edge of the groove; a deflector plate having a first and a second face on opposite sides thereof and an internal smooth wall forming an aperture having an axis and passing through the deflector plate between the said faces, the first of said faces being adapted to bear against a workpiece to which the pin is engaged, a deflector surface extending from said second face to said aperture and comprising a surface of revolution around the axis of the plate, the generator line of which extends toward the said axis as it extends away from said second face; and a metal collar having a central axis, a first and a second end, a peripheral wall defining a passage extending from end to end, an internal thread formed in said peripheral wall, engaging means for engagement by a torque tool to turn the collar onto the pin, a drive section formed on said collar at the first end, which drive section bears the said engaging means, a shear section, said shear section having the least resistance between the said ends of the collar to shear forces developed by torque and attaching the drive section to the remainder of the collar, whereby the drive section shears free from the remainder of the collar upon application of a predetermined torque, and a deformable, fully peripheral, tubular lock section extending axially at the second end of the collar, said lock section having a wall thickness less than that of the portion of the collar which is threaded, and having lateral dimensions such that it can pass over the thread on the pin and engage the deflector surface, whereby to be deflected and permanently deformed by physical displacement of metal into the groove and overhanging the shoulder when the collar is tightened onto the pin, thereby to resist removal of the collar from the pin, the lock section being so proportioned as to have already deflected into the groove before the said shear section shears, and to require permanent physical displacement of metal of the lock section to remove the collar from the pin, the deflector plate being unattachable to the pin or to the collar as a consequence of its smooth wall.

* * * * *

UNITED STATES PATENT OFFICE
CERTIFICATE OF CORRECTION

PATENT NO. : 3,805,863
DATED : April 23, 1974
INVENTOR(S) : Donald G. Starr

It is certified that error appears in the above-identified patent and that said Letters Patent are hereby corrected as shown below:

[54]  References Cited should have the following additions:

| | | | |
|---|---|---|---|
| 1,237,400 | August 1917 | Sosh | 151/2R |
| 2,208,859 | July 1940 | Scott | 151/69 |
| 3,483,612 | December 1969 | Rogge | 151/69 |
| 3,138,987 | June 1964 | Wing | 85/61 |
| 516,068 | February 1955 | Italy (Ponzio) | 151/19R |
| 424,325 | January 1926 | Germany (Zapotetzky) | 151/19R |

Signed and Sealed this seventh Day of October 1975

[SEAL]

Attest:

RUTH C. MASON
*Attesting Officer*

C. MARSHALL DANN
*Commissioner of Patents and Trademarks*